United States Patent
Reddy et al.

(10) Patent No.: US 9,514,748 B2
(45) Date of Patent: Dec. 6, 2016

(54) DIGITAL PERSONAL ASSISTANT INTERACTION WITH IMPERSONATIONS AND RICH MULTIMEDIA IN RESPONSES

(71) Applicant: Microsoft Corporation, Redmond, WA (US)

(72) Inventors: Mouni Reddy, Bellevue, WA (US); Robert J. Howard, III, Bellevue, WA (US); Deborah B. Harrison, Seattle, WA (US); Sogol Malekzadeh, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 14/156,009

(22) Filed: Jan. 15, 2014

(65) Prior Publication Data

US 2015/0199967 A1   Jul. 16, 2015

(51) Int. Cl.
*G10L 13/00* (2006.01)
*G10L 15/22* (2006.01)
(Continued)

(52) U.S. Cl.
CPC ............... *G10L 15/22* (2013.01); *G10L 25/30* (2013.01); *G10L 13/02* (2013.01); *G10L 13/08* (2013.01); *G10L 15/16* (2013.01)

(58) Field of Classification Search
CPC ........ G10L 15/22; G10L 15/30; G10L 15/265; G10L 15/16; G10L 25/30; G10L 15/10; G10L 15/12; G10L 15/00; G10L 17/005; G10L 17/02; G10L 13/08; G10L 13/02; G10L 13/033
(Continued)

(56) References Cited

U.S. PATENT DOCUMENTS 5,918,222 A   6/1999 Fukui et al.
6,144,938 A   11/2000 Surace et al.
(Continued)

FOREIGN PATENT DOCUMENTS

WO   2013155619 A1   10/2013

OTHER PUBLICATIONS https://www.fanfiction.net/s/6141234/1/Buck-Rogers-A-Stitch-in-Time , Keith Shaw, Buck Rogers: A Stitch in Time, Published Jul. 14, 2010.*

(Continued)

*Primary Examiner* — Vu B Hang
(74) *Attorney, Agent, or Firm* — Miia Sula; Micky Minhas

(57) ABSTRACT

Systems, methods, apparatuses, and computer program products are described for implementing a digital personal assistant. The digital personal assistant is capable of determining that a user has asked a question or made a statement that is intended to engage with a persona of the digital personal assistant. In response to determining that the user has asked such a question or made such a statement, the digital personal assistant provides a response thereto by displaying or playing back a multimedia object associated with a popular culture reference within or by a user interface of the digital personal assistant. Additionally or alternatively, in response to determining that the user has asked such a question or made such a statement, the digital personal assistant provides the response thereto by generating or playing back speech that comprises an impersonation of a voice of a person associated with the popular culture reference.

19 Claims, 11 Drawing Sheets

(51) Int. Cl.
  *G10L 25/30* (2013.01)
  *G10L 13/08* (2013.01)
  *G10L 13/02* (2013.01)
  *G10L 15/16* (2006.01)

(58) Field of Classification Search
  USPC ....... 704/231, 232, 235, 237, 238, 239, 246, 704/249, 259, 270
  See application file for complete search history.

(56) References Cited

U.S. PATENT DOCUMENTS

| | | | |
|---|---|---|---|
| 6,721,706 B1 | 4/2004 | Strubbe et al. | |
| 7,225,125 B2 | 5/2007 | Bennett et al. | |
| 8,073,681 B2 | 12/2011 | Baldwin et al. | |
| 8,140,335 B2 | 3/2012 | Kennewick et al. | |
| 8,346,563 B1 | 1/2013 | Hjelm et al. | |
| 8,447,607 B2 | 5/2013 | Weider et al. | |
| 8,498,873 B2 | 7/2013 | Cross, Jr. et al. | |
| 8,903,716 B2 * | 12/2014 | Chen et al. | 704/9 |
| 2006/0155765 A1 | 7/2006 | Takeuchi et al. | |
| 2009/0083143 A1 * | 3/2009 | Tischer | 705/14 |
| 2009/0210217 A1 | 8/2009 | Okada | |
| 2012/0124456 A1 | 5/2012 | Perez et al. | |

OTHER PUBLICATIONS

Microsoft Corporation, Getting Results with Microsoft Office 97, 1995-1997, p. 38.*
Office Assistant wiki—information related to the MS Office Office Assistant Clippit [Clippy] . . . https://en.wikipedia.org/wiki/Office_Assistant . . . http://www.geekwire.com/2011/microsoft-brings-clippy-office-training-game/.*
Buck Rogers in the 25th Century (TV series) wiki, Broadcast dates Sep. 20, 1979-Apr. 16, 1981 via NBC.*
Dr. Theopolis, Multiversal Omnipedia, Television computer character that features in Buck Rogers in the 25th Century.*
Hamakawa et al., Multimedia Objects, Multimedia Systems and Techniques, Kluwer Academic Publishers 1996, pp. 1 and 9.*
Paul, Ryan, "Review: Android's "Google Now" Can Teach Siri a Few Tricks", Published on: Aug. 13, 2012, Available at: http://arstechnica.com/gadgets/2012/08/review-androids-google-now-can-teach-siri-a-few-tricks/, 3 pages.
Brodeur, Seth, "New Leaked Screenshot Suggests"Cortana" is Not Just Limited to Voice Interactions", Published on: Sep. 12, 2013, Available at: http://www.wpcentral.com/new-leaked-screenshot-suggests-cortana-not-just-limited-voice-interactions, 35 pages.
International Search Report & Written Opinion Received for PCT Patent Application No. PCT/US2015/010711, Mail Date: Mar. 18, 2015, 11 Pages.
Second Written Opinion Issued in PCT Application No. PCT/US2015/010711, Mail Date Dec. 15, 2015, 8 Pages.
"International Preliminary Report on Patentability Issued in PCT Application No. PCT/US2015/010711", Mailed Date: Mar. 11, 2016, 09 Pages.

* cited by examiner

DIGITAL PERSONAL ASSISTANT INTERACTION WITH IMPERSONATIONS AND RICH MULTIMEDIA IN RESPONSES

BACKGROUND

Personifying computer interaction is a very common practice in the area of artificial intelligence. The makers of digital personal assistants may imbue their assistants with a personality so as to keep the engagement level with the user very high and also to establish an element of trust between the user and the assistant, thereby facilitating continued use of and interaction with the digital personal assistant.

One technique for keeping the level of engagement high entails making the responses provided by the digital personal assistant funny and entertaining Some conventional implementations of digital personal assistants are programmed to generate funny text responses when a user asks questions having a casual tone. However, conventional digital personal assistants typically do not leverage the full flexibility of the digital canvas when presenting playful responses. Neither do they leverage the power of modern day text-to-speech synthesizing techniques to sound funny or different when providing responses. Furthermore, there is no visual representation of the digital assistant that can be used to convey any aspect of a playful response.

SUMMARY

Systems, methods, apparatuses, and computer program products are described herein for implementing a digital personal assistant. The digital personal assistant is capable of determining that a user has asked a question or made a statement that is intended to engage with a persona of the digital personal assistant as opposed to, for example, requesting that the digital personal assistant obtain information or perform some other task on behalf of the user. In response to determining that the user has asked such a question or made such a statement, the digital personal assistant provides a response thereto by displaying or playing back a multimedia object associated with a popular culture reference within or by a user interface of the digital personal assistant. Additionally or alternatively, in response to determining that the user has asked such a question or made such a statement, the digital personal assistant provides the response thereto by generating or playing back speech that comprises an impersonation of a voice of a person associated with the popular culture reference. Still further, the digital personal assistant may provide the response by displaying within the user interface of the digital personal assistant text that comprises a quotation associated with the popular culture reference, displaying within the user interface of the digital personal assistant a visual representation of the digital personal assistant that evokes the popular culture reference, and/or displaying within the user interface of the digital personal assistant a link that can be activated by the user to access content associated with the popular culture reference.

In particular, a method for implementing a digital personal assistant is described herein. In accordance with the method, a digital representation of an utterance of a user of the digital personal assistant is received. Based on at least an analysis of the digital representation of the utterance, it is determined that the utterance comprises an utterance intended to engage with a persona of the digital personal assistant. In response to at least the determining that the utterance comprises an utterance intended to engage with the persona of the digital personal assistant, the digital personal assistant is caused to generate a response to the utterance. The response to the utterance includes a multimedia object (e.g., image, video content or audio content) that is displayed within or played back by a user interface of the digital personal assistant and that is associated with a popular culture reference. Alternatively or additionally, the response to the utterance includes speech that is generated or played back by the digital personal assistant and that comprises an impersonation of a voice of a person associated with the popular culture reference.

In one embodiment of the foregoing method, the response to the utterance further includes text that is displayed within the user interface of the digital personal assistant, the text comprising a quotation associated with the popular culture reference.

In another embodiment, the speech comprises a quotation associated with the popular culture reference.

In yet another embodiment, the response to the utterance further includes a visual representation of the digital personal assistant that is displayed within the user interface thereof and that evokes the popular culture reference. In further accordance with such an embodiment, the visual representation of the digital personal assistant may comprise an animation of the digital personal assistant.

In still another embodiment, the response to the utterance further includes a link that is displayed within the user interface of the digital personal assistant and that can be activated by the user to access content associated with the popular culture reference.

Depending upon the implementation of the foregoing method, causing the response to the utterance to be generated may include identifying a plurality of eligible responses to the utterance and selecting the response to the utterance from among the plurality of eligible responses to the utterance.

In accordance with another implementation, causing the response to the utterance to be generated includes matching the utterance to a particular utterance type within a hierarchical tree of utterance types, each utterance type in the hierarchical tree of utterance types having one or more responses associated therewith, and selecting the response to the utterance from among the response(s) associated with the particular utterance type.

In accordance with a further implementation, causing the response to the utterance to be generated includes determining that the utterance is associated with a trending topic and in response to determining that the utterance is associated with the trending topic, selecting the response to the utterance from among one or more responses associated with the trending topic.

In accordance with a still further implementation, causing the response to the utterance to be generated including determining that the utterance is an utterance for which there are one or more predefined responses intended to convey the persona of the digital personal assistant, and in response to determining that the utterance is an utterance for which there are one or more predefined responses intended to convey the persona of the digital personal assistant, selecting the response to the utterance from among the one or more predefined responses.

In another embodiment of the foregoing method, causing the response to the utterance to be generated includes sending an audio file that includes the speech or information that identifies the audio file to a computing device executing the digital personal assistant.

In still another embodiment, causing the response to the utterance to be generated includes providing text to a computing device executing the digital personal assistant, the text to be processed by a text-to-speech component of the digital personal assistant to generate the speech.

A computing device is also described herein. The computing device includes at least one processor and a memory. The memory stores computer program logic for execution by the at least one processor. The computer program logic includes one or more components configured to perform operations when executed by the at least one processor. The one or more components includes a digital personal assistant. The digital personal assistant is configured to capture audio that represents an utterance of a user and to transmit the audio to a digital personal assistant backend. The utterance comprises an utterance intended to engage with a persona of the digital personal assistant. The digital personal assistant is further configured to provide a response to the utterance based at least on information received from the digital personal assistant backend. Providing the response includes generating or playing back speech that comprises an impersonation of a voice of a person associated with a popular culture reference.

In one embodiment of the computing device, the digital personal assistant is configured to play back an audio file that includes the speech. In another embodiment of the computing device, the digital personal assistant is configured to apply text-to-speech conversion to text to generate the speech.

In another embodiment of the computing device, providing the response further includes at least one of displaying or playing back a multimedia object by a user interface of the digital personal assistant, the multimedia object being associated with the popular culture reference, displaying text within the user interface of the digital personal assistant, the text comprising a quotation associated with the popular culture reference, displaying a visual representation of the digital personal assistant that evokes the popular culture reference within the user interface of the digital personal assistant, and displaying a link within the user interface of the digital personal assistant that can be activated by the user to access content associated with the popular culture reference.

Another computing device is described herein. The computing device includes at least one processor and a memory. The memory stores computer program logic for execution by the at least one processor. The computer program logic includes one or more components configured to perform operations when executed by the at least one processor. The one or more components include a digital personal assistant. The digital personal assistant is configured to capture audio that represents an utterance of a user and to transmit the audio to a digital personal assistant backend. The utterance comprises an utterance intended to engage with a persona of the digital personal assistant. The digital personal assistant is further configured to provide a response to the utterance based at least on information received from the digital personal assistant backend. Providing the response includes displaying or playing back a multimedia object associated with a popular culture reference by a user interface of the digital personal assistant.

In one embodiment of the computing device, the multimedia object comprises an image, video content, or audio content.

In another embodiment of the computing device, providing the response further includes at least one of generating or playing back speech that comprises an impersonation of a voice of a person associated with the popular culture reference, displaying text within the user interface of the digital personal assistant, the text comprising a quotation associated with the popular culture reference, displaying a visual representation of the digital personal assistant that evokes the popular culture reference within the user interface of the digital personal assistant, and displaying a link within the user interface of the digital personal assistant that can be activated by the user to access content associated with the popular culture reference.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
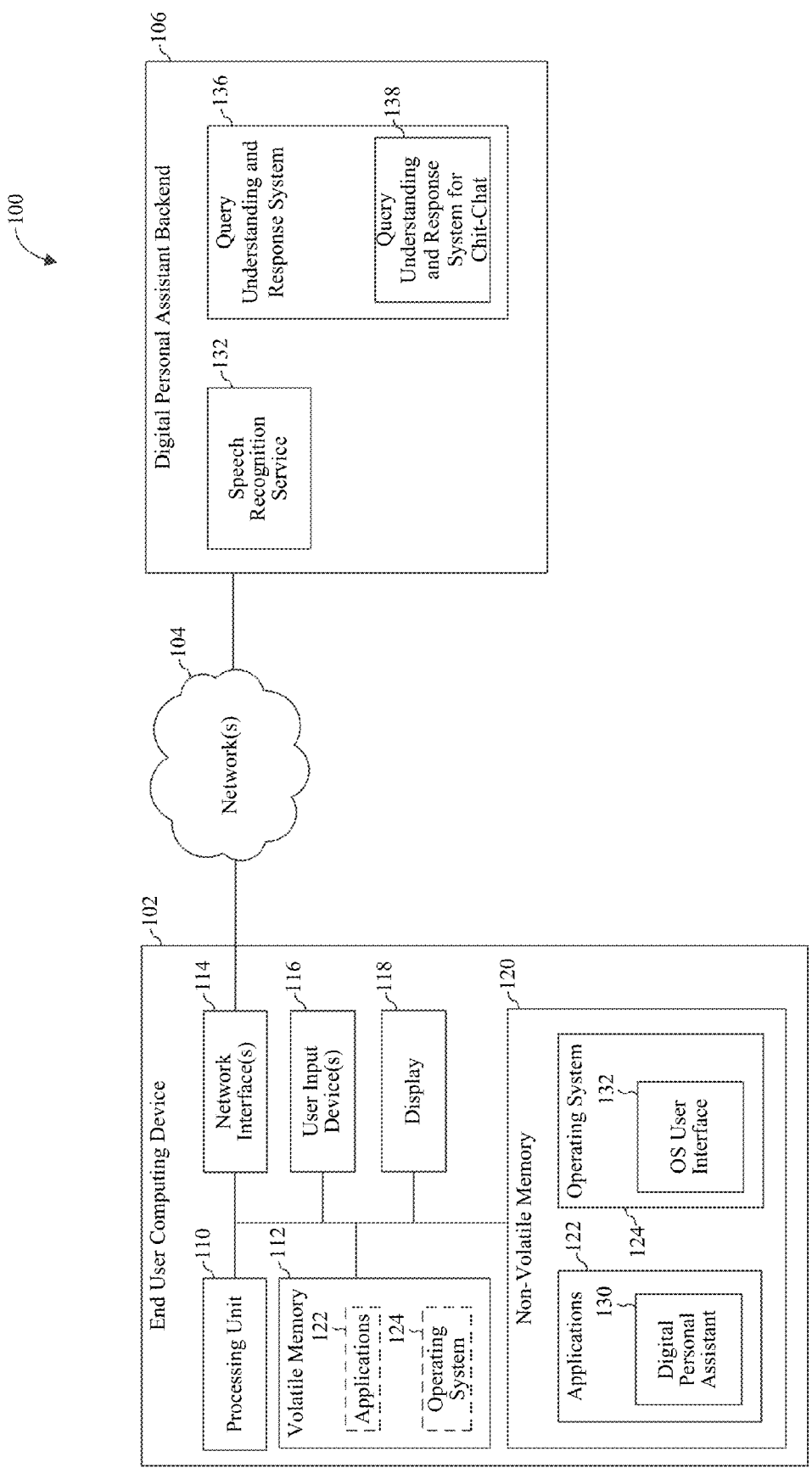
FIG. 1 is a block diagram of an example system that implements a digital personal assistant that utilizes impersonations and multimedia in responding to chit-chat type utterances in accordance with an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Systems, methods, apparatuses, and computer program products are described herein for implementing a digital personal assistant. The digital personal assistant is capable of determining that a user has asked a question or made a statement that is intended to engage with a persona of the digital personal assistant as opposed to, for example, requesting that the digital personal assistant obtain information or perform some other task on behalf of the user. In response to determining that the user has asked such a question or made such a statement, the digital personal assistant provides a response thereto by displaying or playing back a multimedia object associated with a popular culture reference within or by a user interface of the digital personal assistant. Additionally or alternatively, in response to determining that the user has asked such a question or made such a statement, the digital personal assistant provides the response thereto by generating or playing back speech that comprises an impersonation of a voice of a person associated with the popular culture reference. Still further, the digital personal assistant may provide the response by displaying within the user interface of the digital personal assistant text that comprises a quotation associated with the popular culture reference, displaying within the user interface of the digital personal assistant a visual representation of the digital personal assistant that evokes the popular culture reference, and/or displaying within the user interface of the digital personal assistant a link that can be activated by the user to access content associated with the popular culture reference.

By enabling the digital personal assistant to respond to user utterances that are intended to engage with its persona (also referred to herein as "chit-chat type utterances") in the foregoing manner, embodiments described herein can advantageously increase the level of engagement between the user and the digital personal assistant and also establish an element of trust between the user and the assistant, thereby facilitating continued use of and interaction with the digital personal assistant. For example, by providing responses that include multimedia objects, voice impersonations, quotations, and links associated with popular culture references likely to be recognized and/or appreciated by the user, the digital personal assistant can both entertain and establish a sense of commonality with the user.

Section II describes an example system that implements a digital personal assistant that utilizes impersonations and/or multimedia in responding to chit-chat type utterances in accordance with embodiments. Section III describes exemplary methods for implementing a digital personal assistant that utilizes impersonations and/or multimedia in responding to chit-chat type utterances in accordance with embodiments. Section IV describes an example mobile device that may be used to implement a digital personal assistant in accordance with embodiments described herein. Section V describes an example desktop computer that may be used to implement a digital personal assistant in accordance with embodiments described herein. Section VI provides some concluding remarks.

II. Example System that Implements a Digital Personal Assistant that Utilizes Impersonations and/or Multimedia in Responses FIG. 1 is a block diagram of an example system 100 that implements a digital personal assistant that utilizes impersonations and multimedia in responding to chit-chat type utterances in accordance with an example embodiment. As shown in FIG. 1, system 100 includes an end user computing device 102 that is communicatively connected to a digital personal assistant backend 106 via one or more networks 104. Each of these components will now be described.

End user computing device 102 is intended to represent a processor-based electronic device that is capable of executing a software-based digital personal assistant 130 that is installed thereon. Digital personal assistant 130 may be executed on behalf of a user of end user computing device 102. In one embodiment, end user computing device 102 comprises a mobile computing device such as a mobile phone (e.g., a smart phone), a laptop computer, a tablet computer, a netbook, a wearable computer such as a smart watch or a head-mounted computer, a portable media player, a handheld gaming console, a personal navigation assistant, a camera, or any other mobile device capable of executing a digital personal assistant on behalf of a user. One example of a mobile device that may incorporate the functionality of end user computing device 102 will be discussed below in reference to FIG. 14. In another embodiment, end user computing device 102 comprises a desktop computer, a gaming console, or other non-mobile computing platform that is capable of executing a digital personal assistant on behalf of a user. An example desktop computer that may incorporate the functionality of end user computing device 102 will be discussed below in reference to FIG. 15.

End user computing device 102 is capable of communicating with digital personal assistant backend 106 via network 104. Personal assistant backend 106 comprises one or more computers (e.g., servers) that are programmed to provide services in support of the operations of digital personal assistant 130 and other digital personal assistants executing on other end-user computing devices. For example, as will be discussed herein, personal assistant backend 106 includes one or more computers configured to provide services to digital personal assistant 130 relating to speech recognition and query understanding and response. In particular, as shown in FIG. 1, these services are respectively provided by a speech recognition service 132 and a query understanding and response system 136. It is noted that digital personal assistant backend 106 may perform any number of other services on behalf of digital personal assistant 130 although such additional services may not be explicitly described herein.

In one embodiment, digital personal assistant backend 106 comprise a cloud-based backend in which any one of a large number of suitably-configured machines may be arbitrarily selected to render one or more desired services in support of digital personal assistant 130. As will be appreciated by persons skilled in the relevant art(s), such a cloud-based implementation provides a reliable and scalable framework for providing backend services to digital personal assistants, such as digital personal assistant 130.

Network(s) 104 is intended to represent any type of network or combination of networks suitable for facilitating communication between end user computing devices, such as end user computing device 102, and digital personal assistant backend 106. Network(s) 104 may include, for example and without limitation, a wide area network, a local area network, a private network, a public network, a packet network, a circuit-switched network, a wired network, and/or a wireless network.

As further shown in FIG. 1, end user computing device 102 includes a plurality of interconnected components, including a processing unit 110, non-volatile memory 120, volatile memory 112, one or more user input devices 116, a display 118, and one or more network interfaces 114. Each of these components will now be described.

Processing unit 110 is intended to represent one or more microprocessors, each of which may have one or more central processing units (CPUs) or microprocessor cores. Processing unit 110 operates in a well-known manner to execute computer programs (also referred to herein as computer program logic). The execution of such computer programs causes processing unit 110 to perform operations including operations that will be described herein. Each of non-volatile memory 120, volatile memory 112, user input device(s) 116, display 118, and network interface(s) 114 is connected to processing unit 110 via one or more suitable interfaces.

Non-volatile memory 120 comprises one or more computer-readable memory devices that operate to store computer programs and data in a persistent manner, such that stored information will not be lost even when end user computing device 102 is without power or in a powered down state. Non-volatile memory 120 may be implemented using any of a wide variety of non-volatile computer-readable memory devices, including but not limited to, read-only memory (ROM) devices, solid state drives, hard disk drives, magnetic storage media such as magnetic disks and associated drives, optical storage media such as optical disks and associated drives, and flash memory devices such as USB flash drives.

Volatile memory 112 comprises one or more computer-readable memory devices that operate to store computer programs and data in a non-persistent manner, such that the stored information will be lost when end user computing device 102 is without power or in a powered down state. Volatile memory 112 may be implemented using any of a wide variety of volatile computer-readable memory devices including, but not limited to, random access memory (RAM) devices.

Display 118 comprises a device to which content, such as text and images, can be rendered so that it will be visible to a user of end user computing device 102. Some or all of the rendering operations required to display such content may be performed at least in part by processing unit 110. Some or all of the rendering operations may also be performed by a display device interface such as a video or graphics chip or card (not shown in FIG. 1) that is coupled between processing unit 110 and display 118. Depending upon the implementation of end user computing device 102, display 118 may comprise a device that is integrated within the same physical structure or housing as processing unit 110 or may comprise a monitor, projector, or other type of device that is physically separate from a structure or housing that includes processing unit 110 and connected thereto via a suitable wired and/or wireless connection.

User input device(s) 116 comprise one or more devices that operate to generate user input information in response to a user's manipulation or control thereof Such user input information is passed via a suitable interface to processing unit 110 for processing thereof Depending upon the implementation, user input device(s) 116 may include a touch screen (e.g., a touch screen integrated with display 118), a keyboard, a keypad, a mouse, a touch pad, a trackball, a joystick, a pointing stick, a wired glove, a motion tracking sensor, a game controller or gamepad, or a video capture device such as a camera. However, these examples are not intended to be limiting and user input device(s) 116 may include other types of devices other than those listed herein. Depending upon the implementation, each user input device 116 may be integrated within the same physical structure or housing as processing unit 110 (such as an integrated touch screen, touch pad, or keyboard on a mobile device) or physically separate from a physical structure or housing that includes processing unit 110 and connected thereto via a suitable wired and/or wireless connection.

Network interface(s) 114 comprise one or more interfaces that enable end user computing device 102 to communicate over one or more networks 104. For example, network interface(s) 114 may comprise a wired network interface such as an Ethernet interface or a wireless network interface such as an IEEE 802.11 ("Wi-Fi") interface or a 3G telecommunication interface. However, these are examples only and are not intended to be limiting.

As further shown in FIG. 1, non-volatile memory 120 stores a number of software components including a plurality of applications 122 and an operating system 124.

Each application in the plurality of applications 122 comprises a computer program that a user of end user computing device 102 may cause to be executed by processing unit 110. The execution of each application causes certain operations to be performed on behalf of the user, wherein the type of operations performed will vary depending upon how the application is programmed Applications 122 may include, for example and without limitation, a telephony application, an e-mail application, a messaging application, a Web browsing application, a calendar application, a utility application, a game application, a social networking application, a music application, a productivity application, a lifestyle application, a reference application, a travel application, a sports application, a navigation application, a healthcare and fitness application, a news application, a photography application, a finance application, a business application, an education application, a weather application, a books application, a medical application, or the like. As shown in FIG. 1, applications 122 include a digital personal assistant 130, the functions of which will be described in more detail herein.

Applications 122 may be distributed to and/or installed on end user computing device 102 in a variety of ways, depending upon the implementation. For example, in one embodiment, at least one application is downloaded from an application store and installed on end user computing device 102. In another embodiment in which end user device 102 is utilized as part of or in conjunction with an enterprise network, at least one application is distributed to end user computing device 102 by a system administrator using any of a variety of enterprise network management tools and then installed thereon. In yet another embodiment, at least one application is installed on end user computing device 102 by a system builder, such as by an original equipment manufacturer (OEM) or embedded device manufacturer, using any of a variety of suitable system builder utilities. In a further embodiment, an operating system manufacturer may include an application along with operating system 124 that is installed on end user computing device 102.

Operating system 124 comprises a set of programs that manage resources and provide common services for applications that are executed on end user computing device 102, such as applications 122. Among other features, operating system 124 comprises an operating system (OS) user interface 132. OS user interface 132 comprises a component of operating system 124 that generates a user interface by which a user can interact with operating system 124 for various purposes, such as but not limited to finding and launching applications, invoking certain operating system functionality, and setting certain operating system settings. In one embodiment, OS user interface 132 comprises a touch-screen based graphical user interface (GUI), although this is only an example. In further accordance with such an example, each application 122 installed on end user computing device 102 may be represented as an icon or tile within the GUI and invoked by a user through touch-screen interaction with the appropriate icon or tile. However, any of a wide variety of alternative user interface models may be used by OS user interface 132.

Although applications 122 and operating system 124 are shown as being stored in non-volatile memory 120, it is to be understood that during operation of end user computing device 102, applications 122, operating system 124, or portions thereof, may be loaded to volatile memory 112 and executed therefrom as processes by processing unit 110.

Digital personal assistant 130 comprises a computer program that is configured to perform tasks, or services, for a user of end user computing device 102 based on user input as well as features such as location awareness and the ability to access information from a variety of sources including online sources (such as weather or traffic conditions, news, stock prices, user schedules, retail prices, etc.). Examples of tasks that may be performed by digital personal assistant 130 on behalf of the user may include, but are not limited to, placing a phone call to a user-specified person, launching a user-specified application, sending a user-specified e-mail or text message to a user-specified recipient, playing user-specified music, scheduling a meeting or other event on a user calendar, obtaining directions to a user-specified location, obtaining a score associated with a user-specified sporting event, posting user-specified content to a social media web site or microblogging service, recording user-specified reminders or notes, obtaining a weather report, obtaining the current time, setting an alarm at a user-specified time, obtaining a stock price for a user-specified company, finding a nearby commercial establishment, performing an Internet search, or the like. Digital personal assistant 130 may use any of a variety of artificial intelligence techniques to improve its performance over time through continued interaction with the user. Digital personal assistant 130 may also be referred to as an intelligent personal assistant, an intelligent software assistant, a virtual personal assistant, or the like.

Digital personal assistant 130 is configured to provide a user interface by which a user can submit questions, commands, or other verbal input and by which responses to such input may be delivered to the user. In one embodiment, the input may comprise user speech that is captured by one or more microphones of end user computing device 102 (each of which may comprise one of user input devices 116), although this example is not intended to be limiting and user input may be provided in other ways as well. The responses generated by digital personal assistant 130 may be made visible to the user in the form of text, images, or other visual content shown on display 118 within a graphical user interface of digital personal assistant 130. The responses may also comprise computer-generated speech or other audio content that is played back via one or more speakers of end user computing device 102 (not shown in FIG. 1).

In accordance with embodiments, digital personal assistant 130 is capable of determining that a user has asked a question or made a statement that is intended to engage with a persona of digital personal assistant 130 as opposed to, for example, requesting that the digital personal assistant obtain information or perform some other task on behalf of the user. Such questions or statements are often casual or playful in nature and may include, for example, "Will you marry me?," "What is your favorite color?," "Sing me a song," "Tell me a joke," "Knock knock," "How much wood could a woodchuck chuck if a woodchuck could chuck wood?," "Who makes the best phone?," "Where can I hide a body?," "What do you look like?," "You are beautiful," "How old are you?," "Who's your daddy?," "Do you have a boyfriend?," "What is the meaning of life?," "I'd like to get to know you better," or the like. For the sake of convenience, such questions and statements are referred to herein as "chit-chat type utterances" or simply "chit-chat".

As will be discussed below, digital personal assistant 130 is further configured to take certain actions in response to determining that the user has made a chit-chat type utterance. For example, in response to determining that the user has made a chit-chat type utterance, digital personal assistant 130 may provide a response thereto by displaying a multimedia object associated with a popular culture reference within its user interface (when the multimedia object is visual in nature) or playing back by its user interface such a multimedia object (when the multimedia object is auditory in nature). As used herein, the term "popular culture reference" is intended to broadly encompass a reference to any subject matter associated with the customs, arts and/or social interactions of a large portion of a population. For example, and without any limitation whatsoever, a popular culture reference may include a reference to a well-known movie, television show, novel, short story, painting, video game, image, video, cartoon, celebrity, actor or actress, politician or other public figure, stereotype, meme, current event, historical event, or the like.

Additionally or alternatively, in response to determining that the user has made a chit-chat type utterance, digital personal assistant 130 may provide the response thereto by generating or playing back speech that comprises an impersonation of a voice of a person associated with the popular culture reference. Still further, digital personal assistant 130 may be configured to provide the response by displaying within its user interface text that comprises a quotation associated with the popular culture reference, displaying within its user interface a visual representation of the digital personal assistant that evokes the popular culture reference, and/or displaying within its user interface a link that can be activated by the user to access content associated with the popular culture reference.

One manner in which digital personal assistant 130 determines that the user has made a chit-chat type utterance and provides a response thereto will now be described with reference to block diagram 200 of FIG. 2. In particular, block diagram 200 shows how various components of system 100 operate together to enable digital personal assistant 130 to determine that a user has made a chit-chat type utterance and to provide a response thereto.

Figure 2:
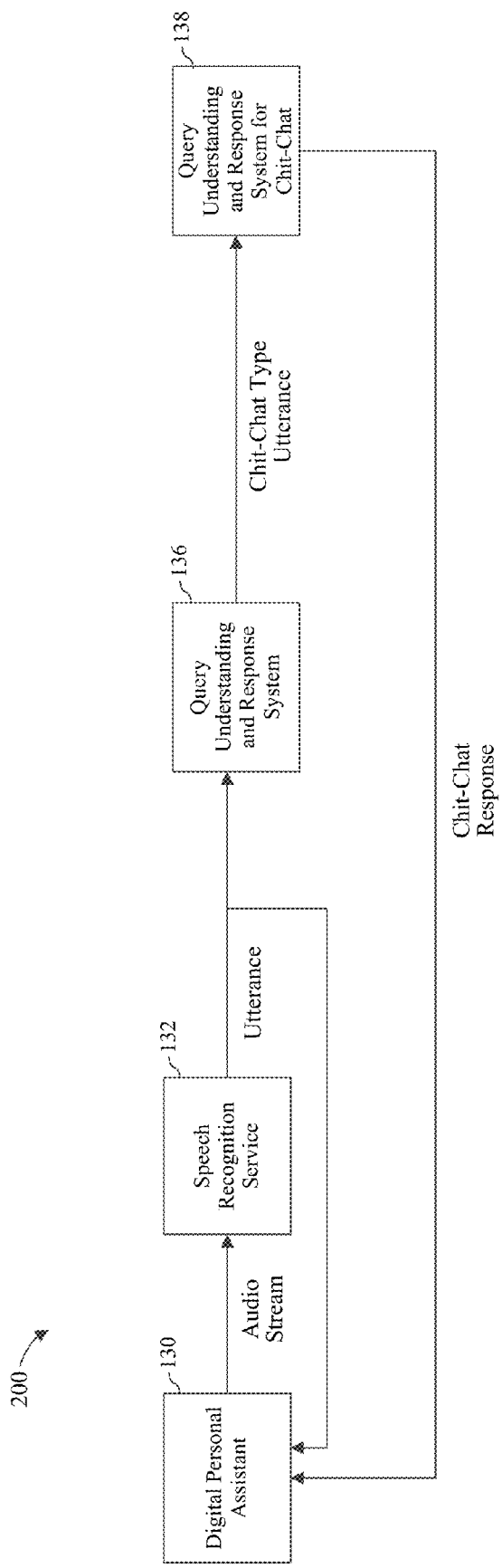
FIG. 2 is a block diagram that shows how various components of the system of FIG. 1 operate to enable a digital personal assistant to determine that a user has made a chit-chat type utterance and to provide a response thereto.

With reference to FIG. 2, the process begins after digital personal assistant 130 has been launched on end user computing device 102. To interact with digital personal assistant 130, a user speaks into one or more microphones of end user computing device 102. The user's utterance is captured by the microphone(s) and converted from analog to digital form in a well-known manner. Digital personal assistant 130 causes the digital representation of the utterance to be transmitted as an audio stream to speech recognition service 132 (which is part of digital personal assistant backend 106) via network(s) 104. For example, in one embodiment, as a user speaks into the microphone(s) of end user computing device, digital personal assistant 130 periodically causes a digital representation of a portion of the user's utterance to be packetized and transmitted to speech recognition service 132 via network(s) 104.

Speech recognition service 132 operates to receive the audio stream transmitted thereto by digital personal assistant 130 and to analyze the audio stream to determine the phonetic content thereof. Once speech recognition service 132 has determined the phonetic content of the audio stream, it then maps the phonetic content to one or more words, which taken together comprise a recognized utterance. Speech recognition service 132 then passes the recognized utterance to query understanding and response system 136.

As shown in FIG. 2, speech recognition service 132 may also transmit the recognized utterance back to digital personal assistant 130 via network(s) 104. Digital personal assistant 130 may display a text version of the recognized utterance within its graphical user interface (visible via display 118) so that the user can view the recognized utterance and determine whether or not the recognized utterance accurately represents what he/she said. In accordance with certain embodiments, digital personal assistant 130 may further provide a means by which the user can edit the recognized utterance if he/she determines that the recognized utterance does not accurately represent what he/she said and transmit the edited version of the utterance to query understanding and response system 136 for further processing thereof.

Query understanding and response system 136 receives the recognized or corrected utterance and analyzes the words thereof to determine how such utterance should be handled thereby. For example, query understanding and response system 136 may determine that the recognized or corrected utterance comprises an invocation of a particular task within a predefined set of tasks. For example and without any limitation whatsoever, the task may comprise placing a phone call to a user-specified person (e.g., "call Brian"), sending a user-specified e-mail or text message to a user-specified recipient (e.g., "text Carol that I am running late"), or creating a reminder (e.g., "remind me to check the oven in an hour."). If query understanding and response system 136 determines that the recognized or corrected utterance comprises an invocation of a particular task within the predefined set, then it will cause specialized logic (e.g., specialized logic within end user computing device 102) to perform the task.

However, if query understanding and response system 136 fails to match the recognized or corrected utterance to any of the tasks within the predefined set, then query understanding and response system 136 may further analyze the words of the utterance to determine how such utterance should be handled thereby. For example, query understanding and response system 136 may determine that the utterance should be handled by conducting a Web search or by offering the user with an opportunity to conduct a Web search. In this case, the utterance may be handled by specialized logic for facilitating Web searching that is internal and/or external to query understanding and response system 136. Alternatively, query understanding and response system 136 may determine based on an analysis of the words of the utterance that the utterance comprises a chit-chat type utterance, which as noted above is an utterance intended to engage with a persona of digital personal assistant 130.

Depending upon the implementation, query understanding and response system 136 may determine that the utterance comprises a chit-chat type utterance based upon an analysis of factors other than or in addition to an analysis of the words of the utterance. For example, query understanding and response system 136 may determine that the utterance comprises a chit-chat type utterance based in part upon an analysis of an intonation of the utterance, upon contextual clues obtained from a conversation history of the user, or upon any other factors that may be deemed helpful in determining that the utterance comprises a chit-chat type utterance.

If query understanding and response system 136 determines that the utterance comprises a chit-chat type utterance, then the utterance will be handled by a query understanding and response system for chit-chat 138, which is a part of query understanding and response system 136. Query understanding and response system for chit-chat 138 is configured to determine the subject matter of the chit-chat type utterance and then, based on the determined subject matter, take steps to cause an appropriate response to the chit-chat type utterance to be output by digital personal assistant 130. As shown in FIG. 2, this may involve sending all or part of a response from query understanding and response system for chit-chat 138 to digital personal assistant 130 via network(s) 104. The composition of the response and the manner in which it is conveyed to and/or generated by digital personal assistant 130 will be discussed in more detail below.

In one embodiment, query understanding and response system for chit-chat 138 determines the subject matter of the chit-chat type utterance and then identifies a plurality of eligible responses that are suitable for responding to the utterance. Query understanding and response system for chit-chat 138 then selects one of the plurality of eligible responses as the response to be provided by digital personal assistant 130. Such selection may be performed at random, in a certain sequence, or by using some other selection methodology. By maintaining a plurality of eligible responses for a given chit-chat type utterance, query understanding and response system for chit-chat 138 can ensure that digital personal assistant 130 will not provide the same response to the same utterance in every instance, thereby providing some variety and unpredictability to the user's interaction with digital personal assistant 130.

In one embodiment, query understanding and response system for chit-chat 138 operates to match the chit-chat type utterance to a particular utterance type within a hierarchical tree of utterance types having one or more responses associated therewith. Query understanding and response system for chit-chat 138 then selects the response to the chit-chat type utterance from among the response(s) associated therewith.

Figure 3:
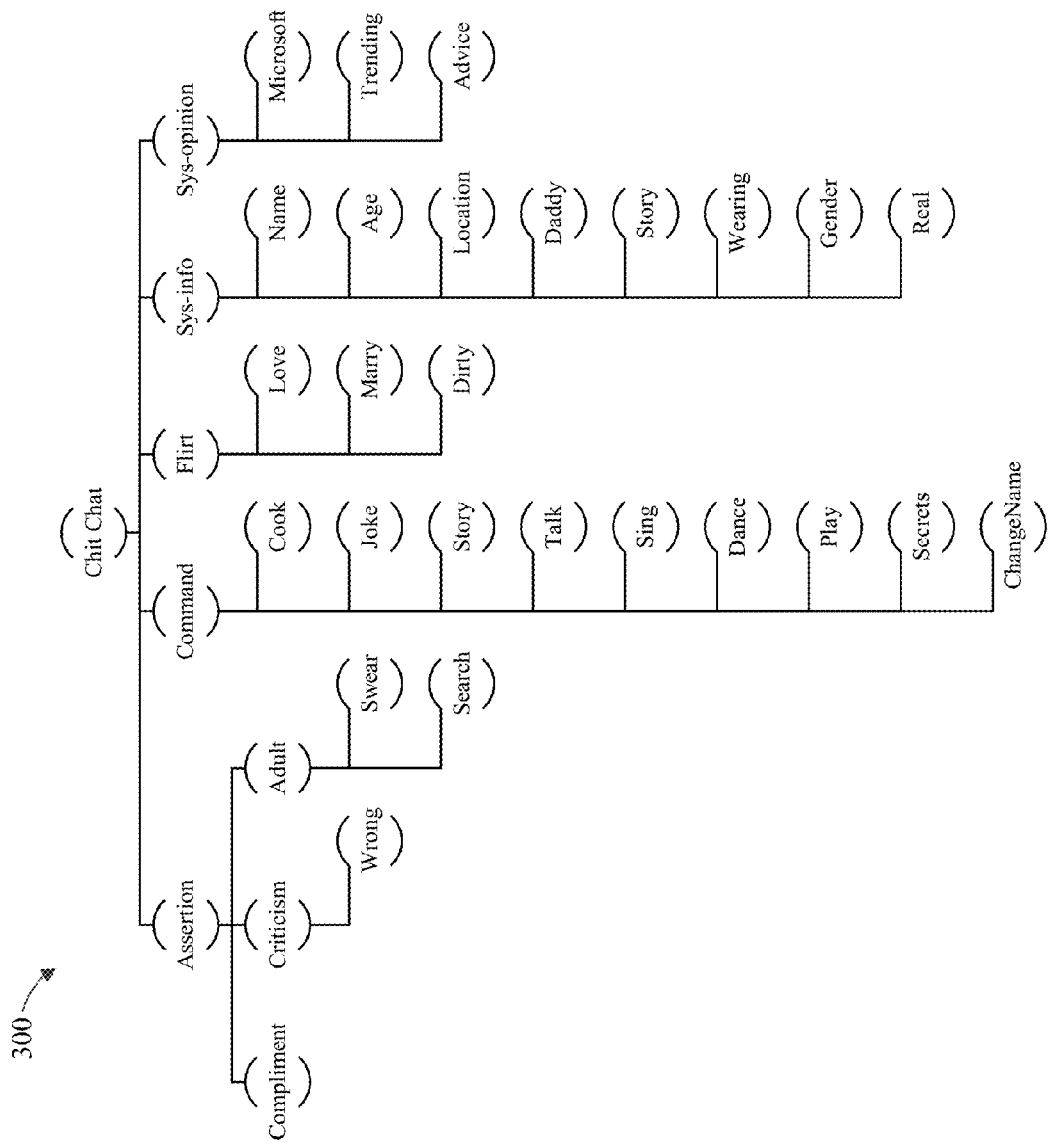
FIG. 3 depicts an example hierarchical tree of utterance types that may be used to select a response to a chit-chat type utterance in accordance with an embodiment.

To help illustrate this concept, FIG. 3 depicts an example hierarchical tree 300 of utterance types that may be used to select a response to a chit-chat type utterance in accordance with an embodiment. As shown in FIG. 3, the root node of hierarchical tree 300 is the general chit-chat utterance type. Every utterance type beneath this root node comprises a chit-chat type utterance. At one level below this root node are chit-chat type utterances that are assertions ("Assertion"), commands ("Command"), flirtatious in nature ("Flirt"), requesting information about digital personal assistant 130 ("Sys-info"), or requesting an opinion from digital personal assistant 130 ("Sys-opinion"). Beneath each of these nodes are further categories and sub-categories of chit-chat utterance types. Thus, utterance types generally go from being broader at the type of hierarchical tree 300 to narrower at the bottom of hierarchical tree 300.

In an embodiment, based upon an analysis of the chit-chat type utterance, query understanding and response system for chit-chat 138 traverses hierarchical tree 300 and matches the utterance to one of the nodes. For example, query understanding and response system for chit-chat 138 may generate a confidence score that a certain chit-chat type utterance should be matched to "Assertion," "Command," "Flirt," "Sys-info" and "Sys-opinion." Query understanding and response system for chit-chat 138 then selects the node for which the highest confidence score has been obtained (assuming that some minimum confidence score has been obtained for at least one of the nodes). Assume for the sake of illustration that the highest confidence score is generated for "Sys-opinion." Then, query understanding and response system for chit-chat 138 will traverse hierarchical tree 300 to the node "Sys-Opinion" and generate a confidence score that the chit-chat type utterance should be matched to each of the child nodes of "Sys-opinion"—namely, "Microsoft," "Trending" and "Advice." Query understanding and response system for chit-chat 138 then selects the child node for which the highest confidence score has been achieved (again, assuming some minimum confidence score has been obtained for at least one of the child nodes). If the confidence score for each of the child nodes is less than some predefined minimum confidence score, than the traversal of hierarchical tree 300 stops at the node "Sys-opinion."

One or more responses are associated with each node in hierarchical tree 300. When query understanding and response system for chit-chat 138 is done traversing hierarchical tree 300 and has selected a matching node for a chit-chat type utterance, then query understanding and response system for chit-chat 138 may select a response from among the one or more responses associated with the matching node.

The foregoing approach to identifying suitable responses to chit-chat type utterances is advantageous in that it allows responses to be defined for both broad groups of chit-chat type utterances as well as more narrow groups within the broader groups. By way of example, for the node "Microsoft" within the node "Sys-opinion," very specific responses to chit-chat type utterances can be crafted (e.g., "I think Microsoft is great!"), since the system has a high level of confidence that the user is asking for the opinion of digital personal assistant 130 about Microsoft. In contrast, for the node "Sys-opinion," a more generic response to chit-chat type utterances can be crafted (e.g., "No comment" or "I'd rather not say"), since the system has a high level of confidence that the user is asking for the opinion of digital personal assistant 130, but cannot determine the subject matter about which an opinion is being sought.

In one embodiment, the types of utterances that may be included in hierarchical tree 300 may be determined through human examination of logs of user utterances and labeling of each utterance with an appropriate utterance type. For example, a crowd sourcing platform such as the Universal Human Relevance System (UHRS), developed by Microsoft Corporation of Redmond, Wash., may be used to obtain human examination and labeling of thousands of user utterances. This crowd sourcing information can then be used to generate hierarchical tree 300. Still other methods for generating a hierarchical tree of utterance types such as hierarchical tree 300 may be used.

In another embodiment, query understanding and response system for chit-chat 138 is configured to maintain one or more responses associated with each of one or more trending topics. Generally speaking, trending topics are topics that are becoming popular or have recently become popular with users and may be identified automatically (e.g., by automatically monitoring utterances submitted to digital personal assistants, search engine queries, microblogs such as TWITTER, social networking sites such as FACEBOOK, news publications, or other sources) or manually (e.g., through human observation of any or all of these sources). When query understanding and response system for chit-chat 138 determines that a chit-chat type utterance is associated with a particular trending topic, then query understanding and response system for chit-chat 138 may select the response to the chit-chat type utterance from among the one or more responses associated with the particular trending topic.

In further accordance with such an embodiment, the trending topics may be represented within a hierarchal tree of utterance types that is used by query understanding and response system for chit-chat 138 to select a suitable response to a chit-chat type utterance. For example, as shown in FIG. 3, one of the nodes under "Sys-Opinion" is "Trending." This node can be used to store responses to chit-chat type utterances that are soliciting an opinion of digital personal assistant 130 in regard to one or more trending topics. In still further accordance with this embodiment, the "Trending" node may have multiple child nodes associated therewith, wherein each child node is associated with a particular trending topic and has one or more responses associated therewith.

In yet another embodiment, query understanding and response system for chit-chat 138 is configured to maintain one or more responses to certain chit-chat type utterances that are intended to convey the persona of digital personal assistant 130. For example, there may be an interest in ensuring that digital personal assistant 130 has something to say about a particular word, phrase, or topic that is associated with its persona. In this case, an editorial team may generated predefined responses to certain chit-chat type utterances to ensure that digital personal assistant 130 provides characteristic responses whenever such topic is discussed. In this case, when query understanding and response system for chit-chat 138 determines that a chit-chat type utterance is an utterance for which there are one or more predefined responses intended to convey the persona of digital personal assistant 130, query understanding and response system for chit-chat 138 will select the response to the chit-chat type utterance from among the one or more predefined responses.

Figure 4:
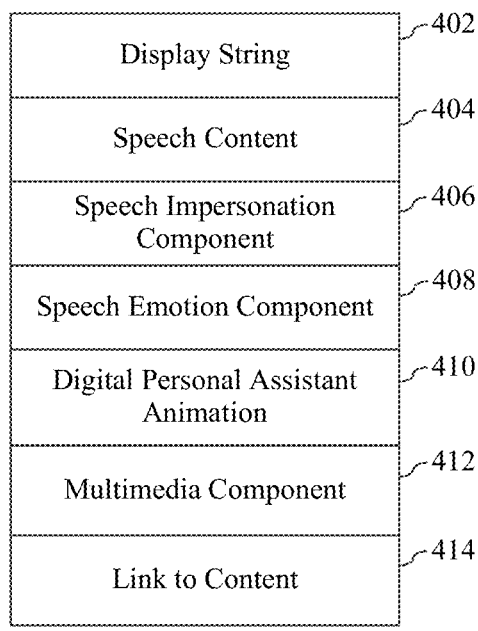
FIG. 4 is a block diagram that shows an example response that may be provided by a digital personal assistant in response to a chit-chat type utterance in accordance with an embodiment FIGS. 5-10 provide illustrative examples of responses to chit-chat type utterances that may be delivered via the user interface of a digital personal assistant in accordance with various embodiments.

FIG. 4 is a block diagram that shows an example response 400 that may be provided by digital personal assistant 130 in response to a chit-chat type utterance in accordance with an embodiment. As shown in FIG. 4, response 400 includes a number of components, including a display string 402, speech content 404, a speech impersonation component 406, a speech emotion component 408, a digital personal assistant animation 410, a multimedia component 412, and a link to content 414.

Depending upon the implementation, each of the components within response 400 may be stored and/or generated by digital personal assistant backend 106 and transmitted to digital personal assistant 130 by query understanding and response system for chit-chat 138 at the time the response is to be provided to a user. Alternatively, one, more than one, or all of the components of response 400 may be stored on and/or generated by end user computing device 102 (e.g., in non-volatile memory 120) and query understanding and response system for chit-chat 138 may send digital personal assistant 130 information sufficient to identify or obtain the component(s) at the time the response is to be provided to a user, so that digital personal assistant 130 can obtain the component(s) locally.

Furthermore, although response 400 includes seven different components, it is to be understood that a response to a chit-chat type utterance may include less than all of the components shown in FIG. 4.

Display string 402 comprises text that is to be displayed within the user interface of digital personal assistant 130. The text may comprise a verbal response to the chit-chat type utterance of the user. In one embodiment, display string 402 may comprise a quotation that is associated with a popular culture reference.

Speech content 404 comprises speech that is to be generated or played back by the user interface of digital personal assistant 130. Digital personal assistant 130 may generate such speech by applying text-to-speech conversion to text that comprises part of speech content 404. Alternatively, digital personal assistant 130 may generate such speech by playing back an audio file that is included within or identified by speech content 404. In one embodiment, speech content 404 comprises an audible version of the content included in display string 402, although this need not be the case. For example, speech content 404 may comprise verbal information that is entirely different than verbal information included in display string 402. Like display string 402, the content of speech content 404 may comprise a quotation that is associated with a popular culture reference.

Speech impersonation component 406 is a component that indicates that digital personal assistant 130 should generate or play back speech content 404 in a manner that impersonates a voice of a person, such as a person associated with a popular culture reference. Speech impersonation component 406 may include or identify an audio file that should be played back by digital personal assistant 130 to perform the impersonation. Alternatively, speech impersonation component 406 may indicate that a special text-to-speech converter should be used by digital personal assistant 130 to generate speech content 404 in a manner that impersonates the voice of the desired person.

Speech emotion component 408 comprises an emotional element that should be applied to speech content 404 when text-to-speech conversion is applied to such content to generate speech.

Digital personal assistant animation 410 comprises an animation of an avatar that represents digital personal assistant 130 that is to be displayed within its user interface. The animation may be designed such that it evokes a popular culture reference. Although the description of response 400 refers to digital personal assistant animation 410, it is to be appreciated that types of visual representations of the avatar other than animations may be used to evoke the popular culture reference, including static images or the like.

Multimedia component 412 comprises one or more multimedia objects that are to be displayed within or played back by the user interface of digital personal assistant 130. Each multimedia object may be associated with a popular culture reference. Depending upon the implementation, each multimedia object may comprise, for example, an image to be displayed within the user interface of digital personal assistant 130, video content to be displayed within the user interface of digital personal assistant 130, or audio content to be played back by the user interface of digital personal assistant 130.

Link to content 414 comprises a link that may be displayed within the user interface of digital personal assistant 130 and that can be activated by the user to access other content. For example, the link can be activated by the user to access content associated with a popular culture reference.

FIGS. 5-10 provide several examples of responses to chit-chat type utterances that may be delivered via the user interface of digital personal assistant 130. These examples help illustrate the various components that may be included in a response to a chit-chat type utterance in accordance with embodiments. In the examples of FIGS. 5-10, end user computing device 102 is a smart phone and display 118 is an integrated display of the smart phone. However, as was previously noted, end user computing device 102 is not limited to smart phones and may be any of a wide variety of mobile and non-mobile computing devices.

Figure 5:
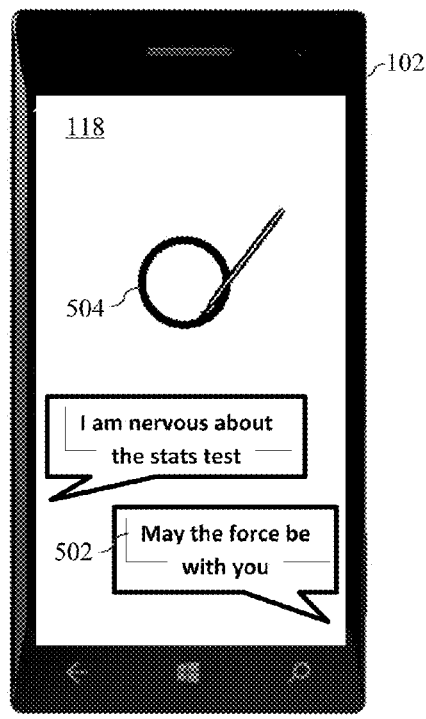

FIG. 5 illustrates a response that may be provided by digital personal assistant 130 to the chit-chat type utterance "I am nervous about the stats test." In response to this chit-chat type utterance, a display string 502 comprising the words "May the force be with you" is displayed within the graphical user interface of digital personal assistant 130. This display string text comprises a well-known quotation from the popular "Star Wars" movies.

In addition, in response to the chit-chat type utterance, a visual representation 504 of digital personal assistant 130 is displayed within the graphical user interface. Visual representation 504 includes a light saber, and thus also evokes the "Star Wars" movies. In an embodiment, visual representation 504 may comprise part of an animation of the avatar of digital personal assistant 130 that swings the light saber about, perhaps accompanied by audible light saber sounds that are played back via one or more speakers of end user computing device 102.

In an embodiment, the response provided in FIG. 5 also includes audible speech that is played back via one or more speakers of end user computing device 102, wherein such speech also includes the words "May the force be with you." In an embodiment, the speech comprises an impersonation of a famous "Star Wars" character such as Yoda or Obi-Wan Kenobi. As was previously described, such speech may be rendered by playing back a designated audio file or by applying a special text-to-speech conversion process to the text "May the force be with you." Depending upon the implementation, the impersonation may be rendered such that it is apparent that a person other than the "Star Wars" character is performing the impersonation (e.g., a default voice associated with digital personal assistant 130 is performing the impersonation). In other implementations, the impersonation may produce a voice that is indistinguishable from that of the "Star Wars" character, or may in fact be the voice of the actor that played the "Star Wars" character.

Taken together, display string 502, visual representation 504, and the speech delivered with an impersonation not only respond appropriately to the user's chit-chat type utterance by offering words of encouragement but also serve to strongly evoke a popular culture reference ("Star Wars") that will likely be instantly familiar to the user and help establish a sense of commonality therewith. Furthermore, since the response includes diverse forms of sensory output including the light saber animation and the impersonated voice, the response is more likely to engage and entertain the user then a flat text response.

Figure 6:
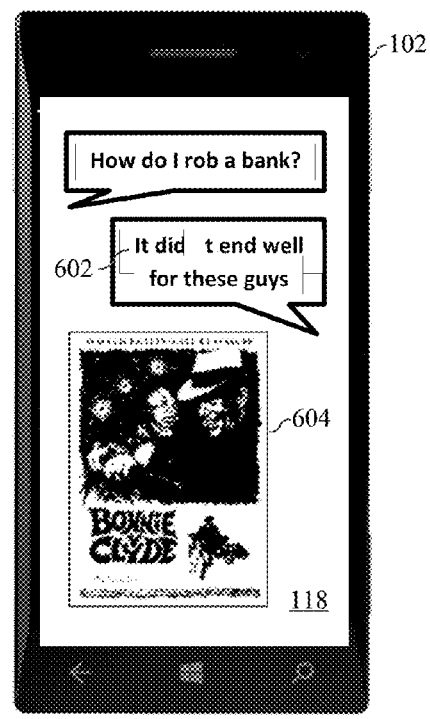

FIG. 6 illustrates a response that may be provided by digital personal assistant 130 to the chit-chat type utterance "How do I rob a bank?" In response to this chit-chat type utterance, a display string 602 comprising the words "It didn't end well for these guys" is displayed within the graphical user interface of digital personal assistant 130. The response may also include audible speech that is played back via one or more speakers of end user computing device 102, wherein such speech also includes the words "It didn't end well for these guys." The text of display string 602 is referring to a multimedia object 604 that is also displayed within the graphical user interface of digital personal assistant 130. As shown in FIG. 6, multimedia object 604 comprises an image of the movie poster for the 1967 movie "Bonnie & Clyde," which is a drama concerning the life and death of well-known bank robbers Bonnie Parker and Clyde Barrow.

Taken together, display string 602 (and corresponding audible speech) and multimedia object 604 comprise a response to the chit-chat utterance "How do I rob a bank" that both responds appropriately to the user's chit-chat type utterance by pointing out the perils of robbing a bank (Bonnie and Clyde were shot to death by police officers) and also evokes a popular culture reference (Bonnie and Clyde and the movie of the same name) that is likely to be familiar to the user and help establish a sense of commonality therewith. Furthermore, since the response forms of output other than flat text, it is more likely to engage and entertain the user.

Figure 7:
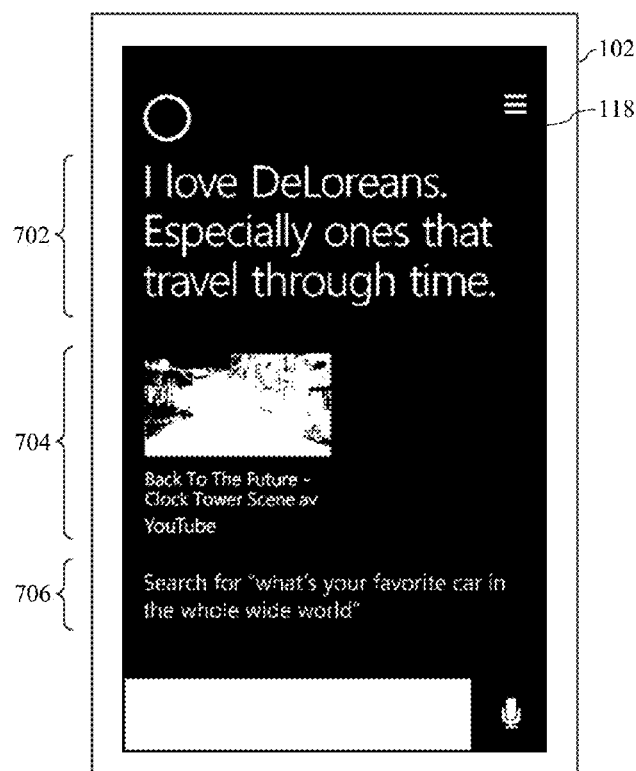

FIG. 7 illustrates a response that may be provided by digital personal assistant 130 to the chit-chat type utterance "What's your favorite car in the whole wide world?" In response to this chit chat type utterance, a display string 702 comprising the words "I love Deloreans. Especially ones that travel through time" is displayed within the graphical user interface of digital personal assistant 130. The response may also include audible speech that is played back via one or more speakers of end user computing device 102, wherein such speech also includes the words "I love Deloreans. Especially ones that travel through time." This text and speech refers to the well-known "Back to the Future" movies.

As also shown in FIG. 7, the response also includes a multimedia object 704 in the form of a YOUTUBE® video called "Back to the Future—Clock Tower Scene.av" that may be played and viewed by the user within the context of the graphical user interface of digital personal assistant 130.

As further shown in FIG. 7, the response includes a link 706 that, when activated by the user, enables the user to search the Web for the phrase "What's your favorite car in the whole wide world?," which is the original utterance. It is noted that in alternate embodiments, a link may be provided that, when activated by the user, enables the user to search the Web for content associated with the popular culture reference (e.g., the "Back to the Future" movies).

Like the responses of FIGS. 5 and 6, the response of FIG. 7 strongly evokes a popular culture reference and thus may establish commonality with the user. Furthermore, the video content that is viewable directly from the graphical user interface of digital personal assistant 130 makes the response highly engaging.

Figure 8:
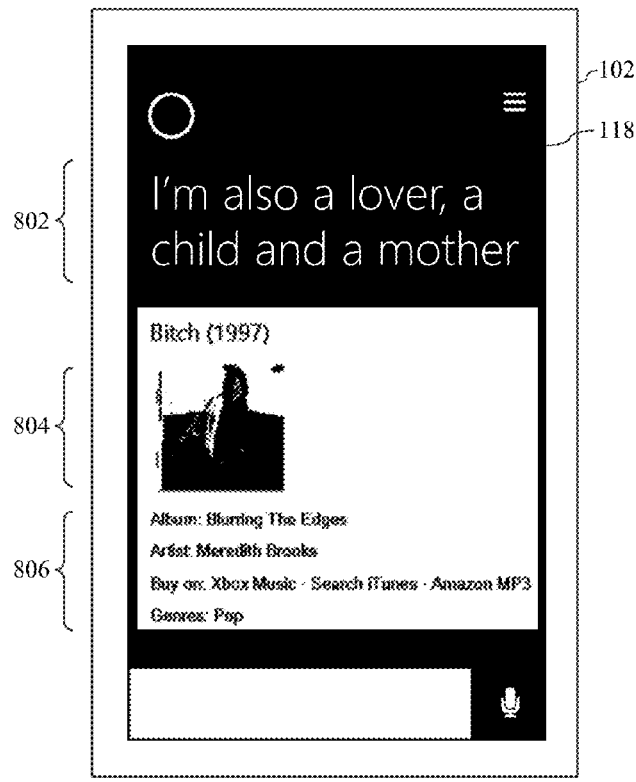

FIG. 8 illustrates a response that may be provided by digital personal assistant 130 to the chit-chat type utterance "You bitch." In response to this chit-chat type utterance, a display string 802 comprising the words "I'm also a lover, a child and a mother" is displayed within the graphical user interface of digital personal assistant 130. The response may also include audible speech that is played back via one or more speakers of end user computing device 102, wherein such speech also includes the words "I'm also a lover, a child and a mother." This text and speech comprises a portion of the lyrics of the well-known song "Bitch" by Meredith Brooks.

As also shown in FIG. 8, the response also includes a multimedia object 804 in the form of an image of Meredith Brooks. The response also includes a text portion 806 that provides information about the song "Bitch" and may also include one or more links that may be activated by the user to purchase a digital copy of the song from one or more sources, respectively.

The response to FIG. 8 cleverly utilizes a pop culture reference to respond to (and somewhat deflect) the seemingly derogatory chit-chat type utterance. It also includes interesting multimedia content that can help engage the user. The response shown in FIG. 8 also illustrates how a response to a chit-chat type utterance can serve in some respects as an advertisement or commercial opportunity in that the user is enabled to purchase the song that is being referred to in the response.

Figure 9:
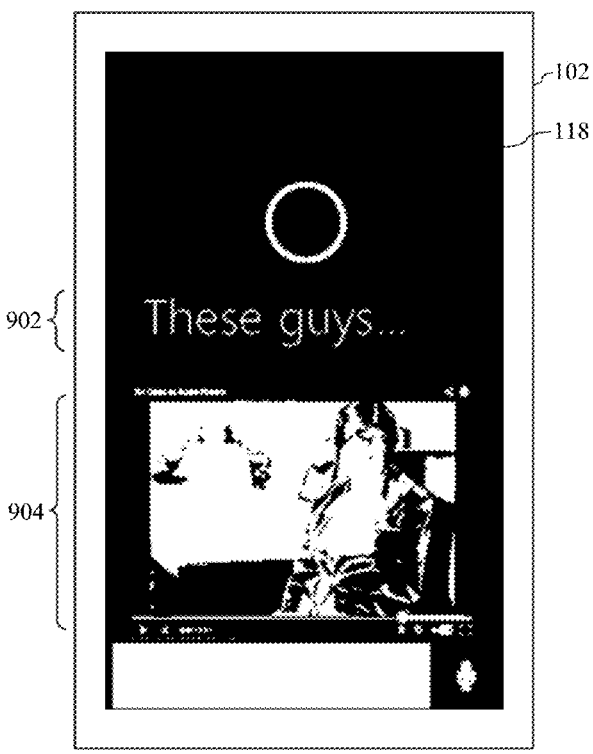

FIG. 9 illustrates a response that may be provided by digital personal assistant 130 to the chit-chat type utterance "Who is your Daddy?" In response to this chit-chat type utterance, a display string 902 comprising the words "These guys" is displayed within the graphical user interface of digital personal assistant 130. The response may also include audible speech that is played back via one or more speakers of end user computing device 102, wherein such speech also includes the words "These guys." The text of display string 902 is referring to a multimedia object 904 that is also displayed within the graphical user interface of digital personal assistant 130. As shown in FIG. 9, multimedia object 904 comprises a video of Bill Gates (chairman of Microsoft) and Steve Ballmer (chief executive officer of Microsoft) dressed as the characters of Austin Powers and Dr. Evil, respectively, from the very popular "Austin Powers" movies. This video may be played and viewed by the user within the context of the graphical user interface of digital personal assistant 130.

In an embodiment in which digital personal assistant 130 is published by Microsoft Corporation of Redmond, Wash., the response shown in FIG. 9 is apt since the figures shown in the video are well-known personas associated with Microsoft. Furthermore, the video content is amusing and engaging for the user.

Figure 10:

FIG. 10 illustrates a response that may be provided by digital personal assistant 130 to the chit-chat type utterance "Show me something funny?" In response to this chit-chat type utterance, a display string 1002 comprising the words "A friend of mine has an opinion" is displayed within the graphical user interface of digital personal assistant 130. The response may also include audible speech that is played back via one or more speakers of end user computing device 102, wherein such speech also includes the words "A friend of mine has an opinion." The text of display string 1002 is referring to a multimedia object 1004 that is also displayed within the graphical user interface of digital personal assistant 130. As shown in FIG. 10, multimedia object 1004 comprises an image of a grumpy-looking cat with the tagline: "I had fun once. It was horrible." This image is a reference to the popular "Grumpy Cat" internet meme, which may be instantly recognizable to the user and which may also serve to amuse and engage the user.

The foregoing examples of FIGS. 5-10 have been provided herein by way of example only. Persons skilled in the relevant art(s) will appreciate that a wide variety of responses to chit-chat type utterances may be provided other than those depicted in FIGS. 5-10. Such responses may include any one or more of the response components previously described in reference to FIG. 4, as well as additional components.

Figure 11:
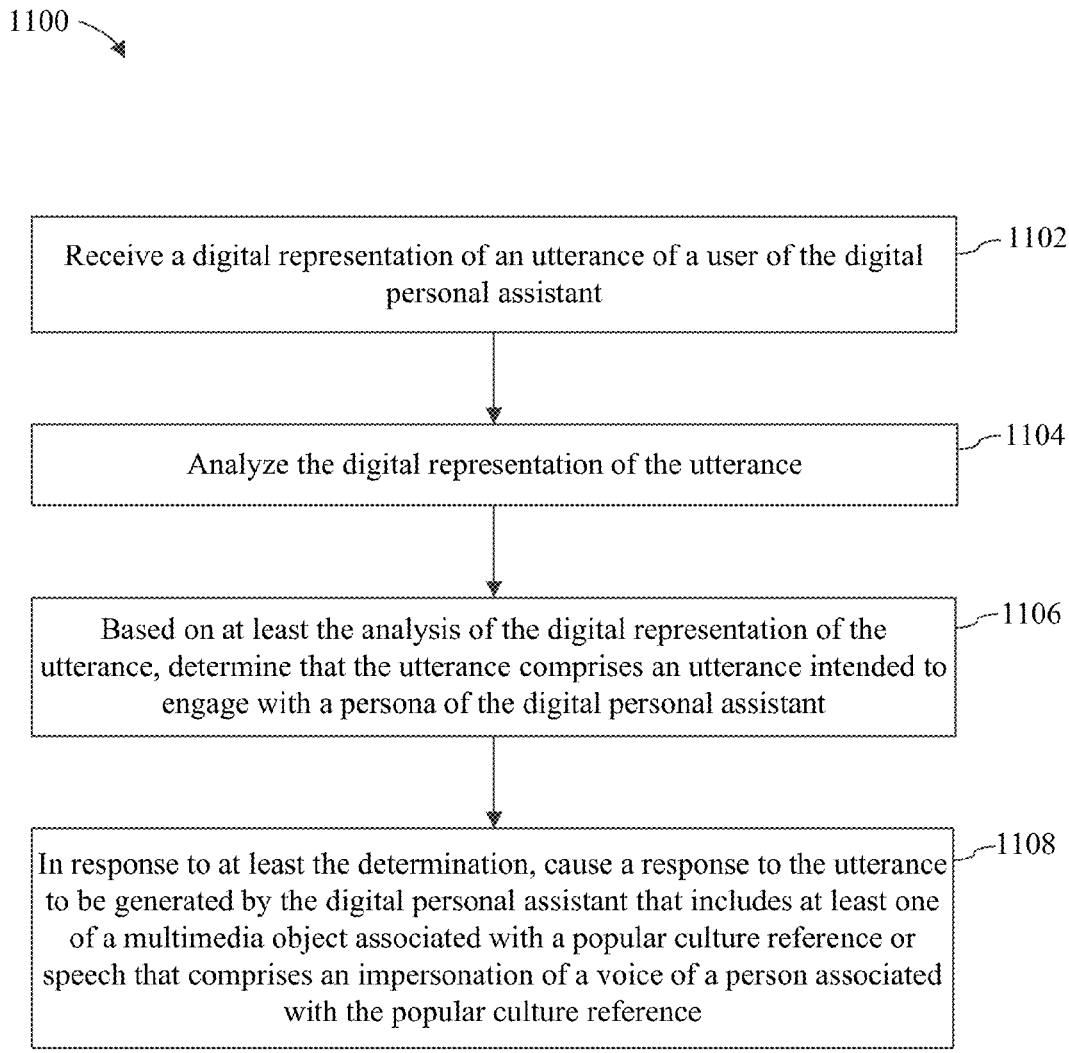
FIG. 11 depicts a flowchart of a method for implementing a digital personal assistant that utilizes impersonations and/or multimedia in responding to chit-chat type utterances in accordance with an embodiment.

III. Example Methods for Implementing a Digital Personal Assistant that Utilizes Impersonations and/or Multimedia in Responses FIG. 11 depicts a flowchart 1100 of a method for implementing a digital personal assistant that utilizes impersonations and/or multimedia in responding to chit-chat type utterances in accordance with an embodiment. The method of flowchart 1100 may be performed, for example, by digital personal assistant backend 106 as discussed above in reference to FIG. 1. Accordingly, the method of flowchart 1100 will now be described with continued reference to system 100 of FIG. 1. However, the method is not limited to that implementation.

As shown in FIG. 11, the method of flowchart 1100 begins at step 1102 in which a digital representation of an utterance of a user of a digital personal assistant is received. The digital representation of the utterance may comprise, for example, the utterance that is generated by speech recognition service 132 or the corrected utterance generated through user interaction with digital personal assistant 130 as discussed above in reference to FIG. 2. As further discussed in regard to that figure, the digital representation of the utterance is received by query understanding and response system 136.

At step 1104, the digital representation of the utterance is analyzed. As discussed above in reference to FIG. 2, this step may entail the analysis performed by query understanding and response system 136 to determine if the utterance comprises a chit-chat type utterance.

At step 1106, based on at least the analysis of the digital representation of the utterance, it is determined that the utterance comprises an utterance intended to engage with a persona of the digital personal assistant. As discussed above in reference to FIG. 2, this step occurs when query understanding and response system 136 determines that the utterance is a chit-chat type utterance. As previously noted, this determination may be based on the analysis of the utterance performed by query understanding and response system 136.

At step 1108, in response to at least the determination made in step 1106, a response to the utterance is caused to be generated by the digital personal assistant that includes at least one of a multimedia object associated with a popular culture reference and speech that comprises an impersonation of a voice of a person associated with the popular culture reference. The multimedia object may comprise, for example, an image, video content, or audio content, and may be displayed within or played back by a user interface of the digital personal assistant. The speech may be generated or played back by the digital personal assistant. This step may be performed for example, by query understanding and response system for chit-chat 138 which causes digital personal assistant 130 to provide a response that includes a multimedia object, such as multimedia component 404 described above in reference to FIG. 4, or that includes impersonated speech as indicated by speech impersonation component 406 as described above in reference to FIG. 4. The manner in which query understanding and response system for chit-chat 138 performs this function has been previously described.

As was also previously described, the response to the utterance discussed in step 1108 may further include text that is displayed within the user interface of the digital personal assistant, the text comprising a quotation associated with the popular culture reference, a visual representation of the digital personal assistant (e.g., an animation of the digital personal assistant) that is displayed within the user interface thereof and that evokes the popular culture reference, and/or a link that is displayed within the user interface of the digital personal assistant and that can be activated by the user to access content, such as content associated with the chit-chat type utterance or with the popular culture reference. Additionally, the speech that is generated or played back by the digital personal assistant may comprise a quotation associated with the popular culture reference.

In one embodiment, causing a response to the utterance to be generated in step 1108 comprises identifying a plurality of eligible responses to the utterance and then selecting the response to the utterance from among the plurality of eligible responses to the utterance.

In another embodiment, causing a response to the utterance to be generated in step 1108 comprises matching the utterance to a particular utterance type within a hierarchical tree of utterance types (e.g., hierarchical tree 300 as discussed above in reference to FIG. 3), each utterance type in the hierarchical tree of utterance types having one or more responses associated therewith. After the matching, the response to the utterance is selected from among the response(s) associated with the particular utterance type.

In yet another embodiment, causing a response to the utterance to be generated in step 1108 comprises determining that the utterance is associated with a trending topic and then, in response to determining that the utterance is associated with a trending topic, selecting the response to the utterance from among one or more responses associated with the trending topic.

In a further embodiment, causing a response to the utterance to be generated in step 1108 comprises determining that the utterance is an utterance for which there are one or more predefined responses intended to convey the persona of the digital personal assistant and, in response to this determination, selecting the response to the utterance from among the one or more predefined responses.

In a still further embodiment, causing a response to the utterance to be generated in step 1108 comprises sending an audio file that includes the speech or information that identifies the audio file to a computing device executing the digital personal assistant. This step may be performed, for example, when query understanding and response system for chit-chat 138 sends an audio file that includes the impersonated speech to end user computing device 102 so that it can be accessed and played back by digital personal assistant 130 or when query understanding and response system for chit-chat 138 sends information that identifies such an audio file to digital personal assistant 130 so that the audio file can be obtained locally by digital personal assistant 130.

In yet another embodiment, causing a response to the utterance to be generated in step 1108 comprises providing text to a computing device executing the digital personal assistant, wherein the text is to be processed by a text-to-speech component of the digital personal assistant to generate the speech. This step may be performed, for example, when query understanding and response system for chit-chat 138 sends an indication to digital personal assistant 130 that digital personal assistant 130 should apply a special text-to-speech converter to designated text to cause the text to be converted to speech in a manner that impersonates the voice of a particular person.

Figure 12:
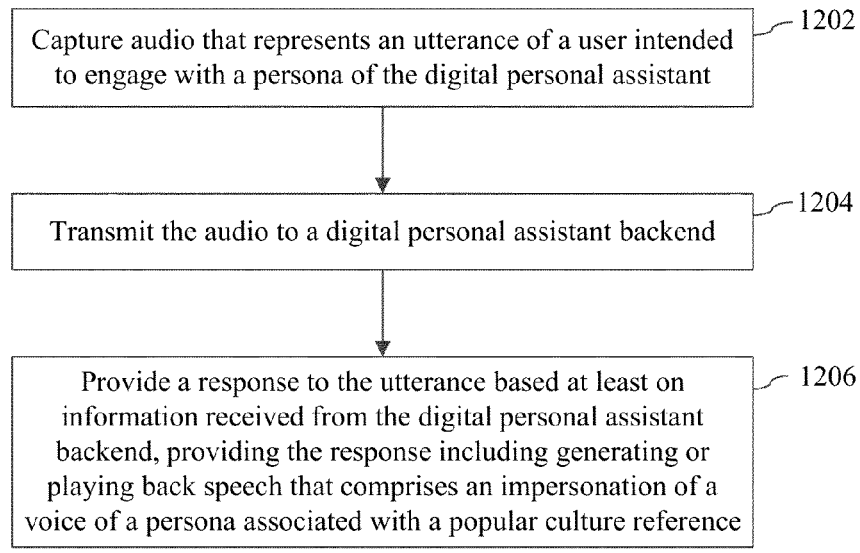
FIG. 12 depicts a flowchart of a method by which a digital personal assistant provides a response to a chit-chat type utterance that includes a voice impersonation in accordance with an embodiment.

FIG. 12 depicts a flowchart 1200 of a method by which a digital personal assistant provides a response to a chit-chat type utterance that includes a voice impersonation in accordance with an embodiment. The method of flowchart 1200 may be performed, for example, by digital personal assistant 130 as discussed above in reference to FIG. 1. Accordingly, the method of flowchart 1200 will now be described with continued reference to system 100 of FIG. 1. However, the method is not limited to that implementation.

As shown in FIG. 12, the method of flowchart 1200 begins at step 1202, in which digital personal assistant 130 captures audio that represents an utterance of a user intended to engage with a persona of digital personal assistant 130.

At step 1204, digital personal assistant 130 transmits the audio to digital personal assistant backend 106.

At step 1206, digital personal assistant 130 provides a response to the utterance based at least on information received from digital personal assistant backend 106. Providing the response includes generating or playing back speech that comprises an impersonation of a voice of a persona associated with a popular culture reference.

In an embodiment, providing the response in step 1206 include playing back an audio file that includes the speech. In an alternate embodiment, providing the response in step 1206 includes applying text-to-speech conversion to text to generate the speech.

In accordance with further embodiments, providing the response in step 1206 includes one or more of: displaying or playing back a multimedia object by a user interface of digital personal assistant 130, the multimedia object being associated with the popular culture reference; displaying text within the user interface of the digital personal assistant, the text comprising a quotation associated with the popular culture reference; displaying a visual representation of the digital personal assistant that evokes the popular culture reference within the user interface of the digital personal assistant; and displaying a link within the user interface of the digital personal assistant that can be activated by the user to access content, such as content associated with the utterance or with the popular culture reference.

Figure 13:
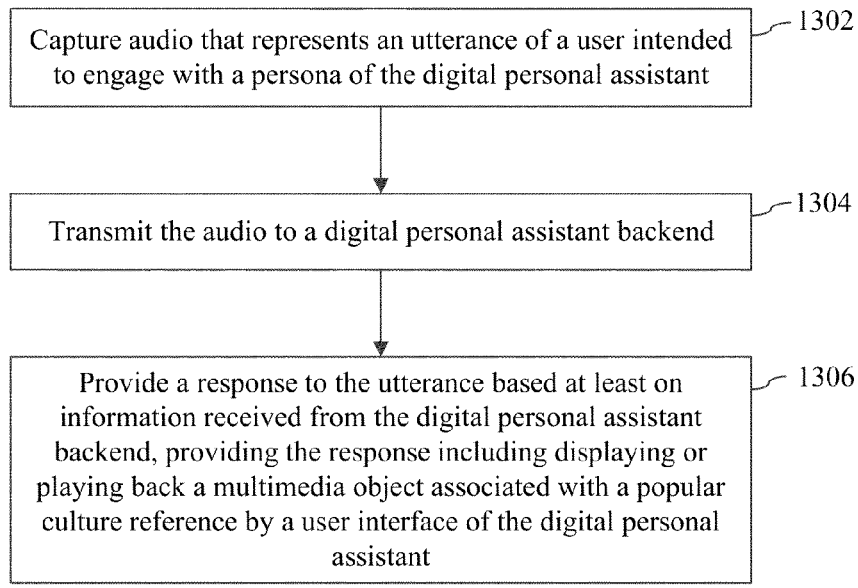
FIG. 13 depicts a flowchart of a method by which a digital personal assistant provides a response to a chit-chat type utterance that includes a multimedia object in accordance with an embodiment.

FIG. 13 depicts a flowchart 1300 of a method by which a digital personal assistant provides a response to a chit-chat type utterance that includes a multimedia object in accordance with an embodiment. The method of flowchart 1300 may be performed, for example, by digital personal assistant 130 as discussed above in reference to FIG. 1. Accordingly, the method of flowchart 1300 will now be described with continued reference to system 100 of FIG. 1. However, the method is not limited to that implementation.

As shown in FIG. 13, the method of flowchart 1300 begins at step 1302, in which digital personal assistant 130 captures audio that represents an utterance of a user intended to engage with a persona of digital personal assistant 130.

At step 1304, digital personal assistant 130 transmits the audio to digital personal assistant backend 106.

At step 1306, digital personal assistant 130 provides a response to the utterance based at least on information received from digital personal assistant backend 106. Providing the response includes displaying or playing back a multimedia object associated with a popular culture reference by a user interface of digital personal assistant 130.

In an embodiment, displaying or playing back the multimedia object in step 1306 comprises displaying an image or video content or playing back audio content by the user interface of digital personal assistant 130.

In accordance with further embodiments, providing the response in step 1306 includes one or more of: generating or playing back speech that comprises an impersonation of a voice of a person associated with a popular culture reference; displaying text within the user interface of the digital personal assistant, the text comprising a quotation associated with the popular culture reference; displaying a visual representation of the digital personal assistant that evokes the popular culture reference within the user interface of the digital personal assistant; and displaying a link within the user interface of the digital personal assistant that can be activated by the user to access content, such as content associated with the utterance or with the popular culture reference.

IV. Example Mobile Device Implementation

Figure 14:
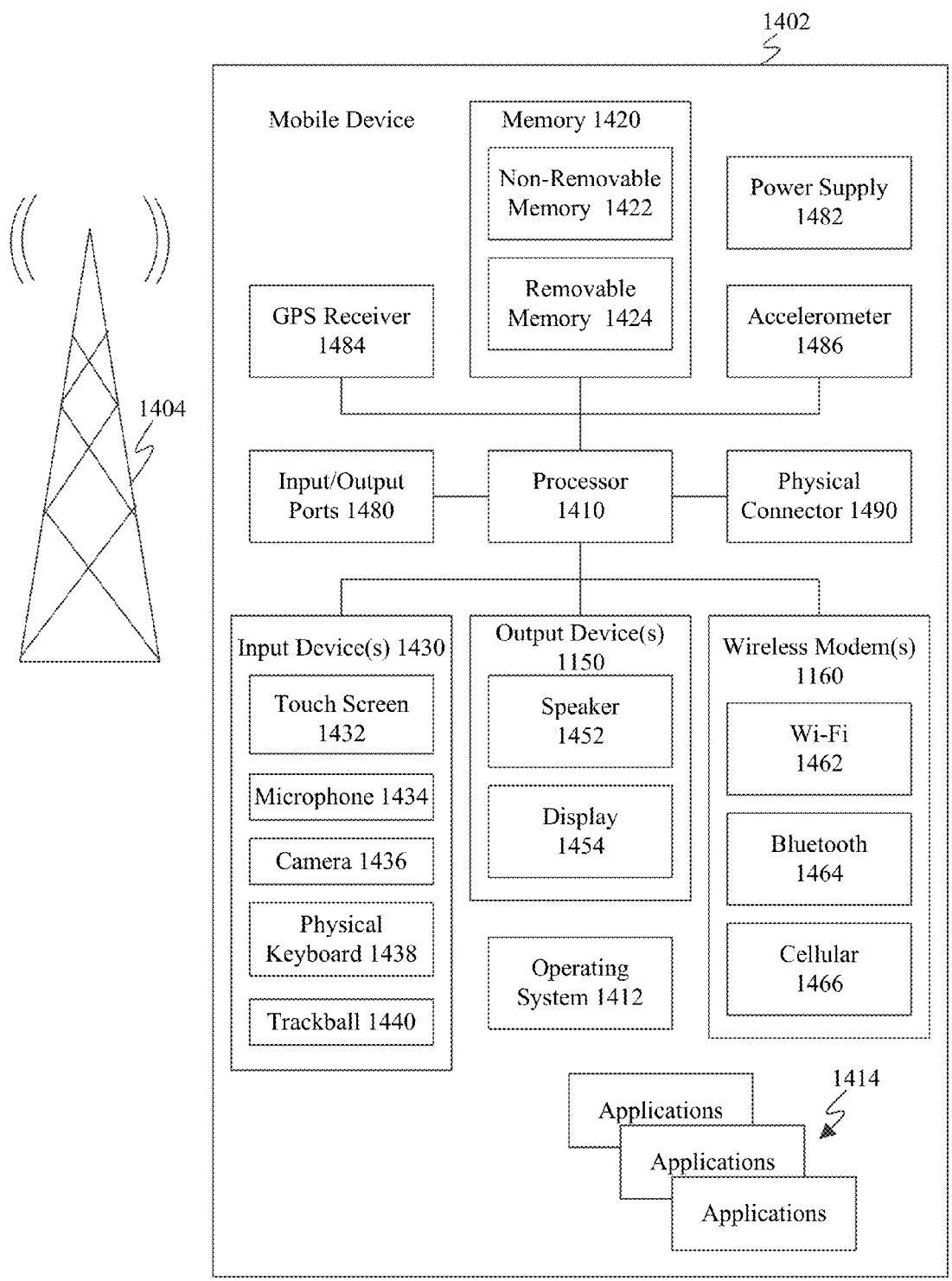
FIG. 14 is a block diagram of an example mobile device that may be used to implement various embodiments.

FIG. 14 is a block diagram of an exemplary mobile device 1402 that may be used to implement end user computing device 102 as described above in reference to FIG. 1. As shown in FIG. 14, mobile device 1402 includes a variety of optional hardware and software components. Any component in mobile device 1402 can communicate with any other component, although not all connections are shown for ease of illustration. Mobile device 1402 can be any of a variety of computing devices (e.g., cell phone, smartphone, handheld computer, Personal Digital Assistant (PDA), etc.) and can allow wireless two-way communications with one or more mobile communications networks 1404, such as a cellular or satellite network, or with a local area or wide area network.

The illustrated mobile device 1402 can include a controller or processor 1410 (e.g., signal processor, microprocessor, ASIC, or other control and processing logic circuitry) for performing such tasks as signal coding, data processing, input/output processing, power control, and/or other functions. An operating system 1412 can control the allocation and usage of the components of mobile device 1402 and support for one or more application programs 1414 (also referred to as "applications" or "apps"). Application programs 1414 may include common mobile computing applications (e.g., e-mail applications, calendars, contact managers, Web browsers, messaging applications) and any other computing applications (e.g., word processing applications, mapping applications, media player applications). In one embodiment, application programs 1414 include digital personal assistant 130.

The illustrated mobile device 1402 can include memory 1420. Memory 1420 can include non-removable memory 1422 and/or removable memory 1424. Non-removable memory 1422 can include RAM, ROM, flash memory, a hard disk, or other well-known memory devices or technologies. Removable memory 1424 can include flash memory or a Subscriber Identity Module (SIM) card, which is well known in GSM communication systems, or other well-known memory devices or technologies, such as "smart cards." Memory 1420 can be used for storing data and/or code for running operating system 1412 and applications 1414. Example data can include Web pages, text, images, sound files, video data, or other data to be sent to and/or received from one or more network servers or other devices via one or more wired or wireless networks. Memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 1402 can support one or more input devices 1430, such as a touch screen 1432, a microphone 1434, a camera 1436, a physical keyboard 1438 and/or a trackball 1440 and one or more output devices 1450, such as a speaker 1452 and a display 1454. Touch screens, such as touch screen 1432, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens.

Other possible output devices (not shown) can include piezoelectric or other haptic output devices. Some devices can serve more than one input/output function. For example, touch screen 1432 and display 1454 can be combined in a single input/output device. The input devices 1430 can include a Natural User Interface (NUI).

Wireless modem(s) 1460 can be coupled to antenna(s) (not shown) and can support two-way communications between the processor 1410 and external devices, as is well understood in the art. The modem(s) 1460 are shown generically and can include a cellular modem 1466 for communicating with the mobile communication network 1404 and/or other radio-based modems (e.g., Bluetooth 1464 and/or Wi-Fi 1462). At least one of the wireless modem(s) 1460 is typically configured for communication with one or more cellular networks, such as a GSM network for data and voice communications within a single cellular network, between cellular networks, or between the mobile device and a public switched telephone network (PSTN).

Mobile device 1402 can further include at least one input/output port 1480, a power supply 1482, a satellite navigation system receiver 1484, such as a Global Positioning System (GPS) receiver, an accelerometer 1486, and/or a physical connector 1490, which can be a USB port, IEEE 1394 (FireWire) port, and/or RS-232 port. The illustrated components of mobile device 1402 are not required or all-inclusive, as any components can be deleted and other components can be added as would be recognized by one skilled in the art.

In an embodiment, certain components of mobile device 1402 are configured to perform the operations attributed to digital personal assistant 130 as described in preceding sections. Computer program logic for performing the operations attributed to digital personal assistant 130 as described above may be stored in memory 1420 and executed by processor 1410. By executing such computer program logic, processor 1410 may be caused to implement any of the features of digital personal assistant 130 as described above in reference to FIG. 1. Also, by executing such computer program logic, processor 1410 may be caused to perform any or all of the steps of any or all of the flowcharts depicted in FIGS. 12 and 13.

V. Example Computer System Implementation

Figure 15:
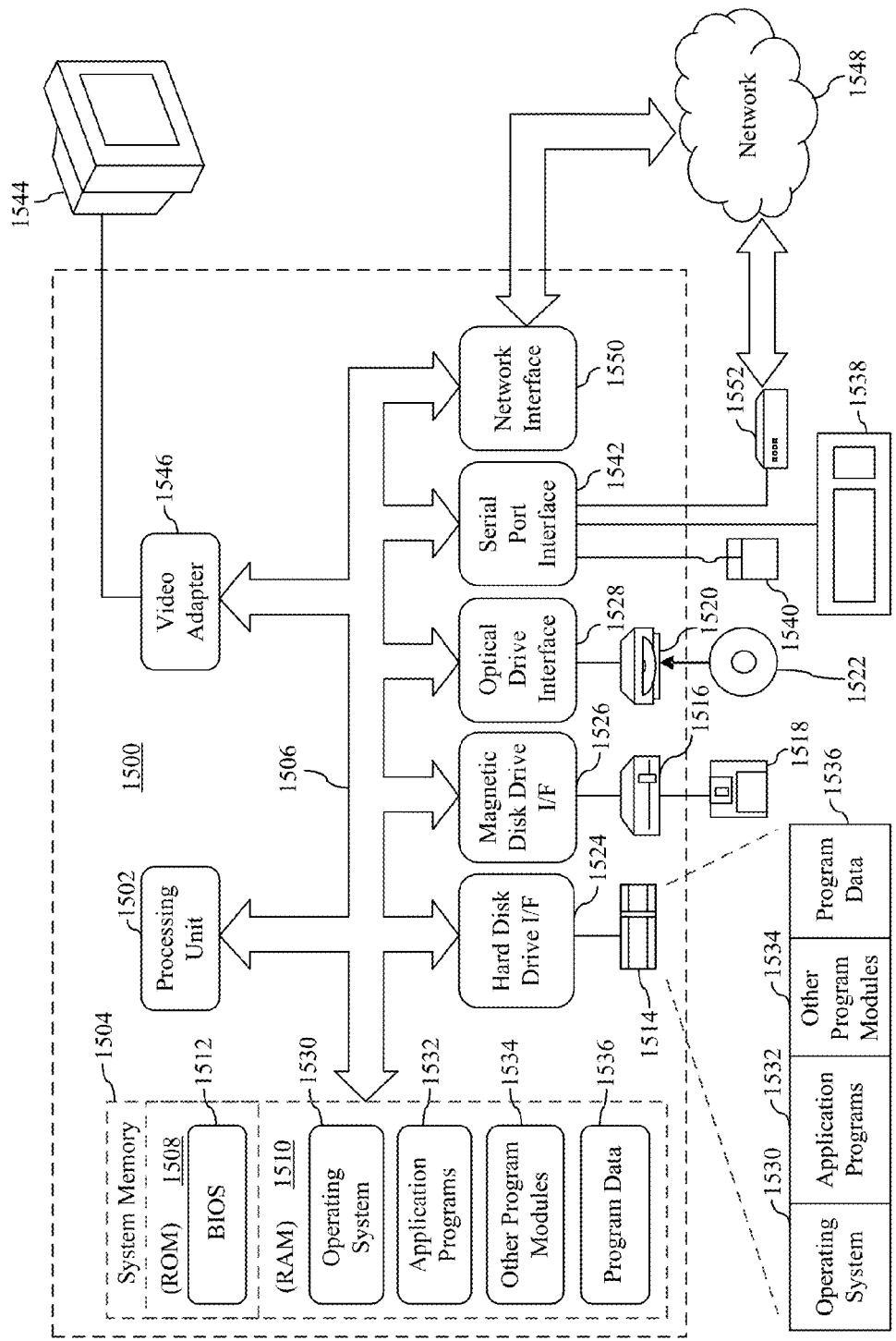
FIG. 15 is a block diagram of an example processor-based computer system that may be used to implement various embodiments.

FIG. 15 depicts an example processor-based computer system 1500 that may be used to implement various embodiments described herein. For example, system 1500 may be used to implement end user computing device 102 or any of the computers used to implement digital personal assistant backend 106 as described above in reference to FIG. 1. System 1500 may also be used to implement any or all of the steps of any or all of the flowcharts depicted in FIGS. 11-13. The description of system 1500 provided herein is provided for purposes of illustration, and is not intended to be limiting. Embodiments may be implemented in further types of computer systems, as would be known to persons skilled in the relevant art(s).

As shown in FIG. 15, system 1500 includes a processing unit 1502, a system memory 1504, and a bus 1506 that couples various system components including system memory 1504 to processing unit 1502. Processing unit 1502 may comprise one or more microprocessors or microprocessor cores. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

System 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, BLU-RAY™ disk or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1530, one or more application programs 1532, other program modules 1534, and program data 1536. In accordance with various embodiments, the program modules may include computer program logic that is executable by processing unit 1502 to perform any or all of the functions and features of end user computing device 102 or any of the computers used to implement digital personal assistant backend 106 as described above in reference to FIG. 1. The program modules may also include computer program logic that, when executed by processing unit 1502, performs any of the steps or operations shown or described in reference to the flowcharts of FIGS. 11-13.

A user may enter commands and information into system 1500 through input devices such as a keyboard 1538 and a pointing device 1540. Other input devices (not shown) may include a microphone, joystick, game controller, scanner, or the like. In one embodiment, a touch screen is provided in conjunction with a display 1544 to allow a user to provide user input via the application of a touch (as by a finger or stylus for example) to one or more points on the touch screen. These and other input devices are often connected to processing unit 1502 through a serial port interface 1542 that is coupled to bus 1506, but may be connected by other interfaces, such as a parallel port, game port, or a universal serial bus (USB). Such interfaces may be wired or wireless interfaces.

A display 1544 is also connected to bus 1506 via an interface, such as a video adapter 1546. In addition to display 1544, system 1500 may include other peripheral output devices (not shown) such as speakers and printers.

System 1500 is connected to a network 1548 (e.g., a local area network or wide area network such as the Internet) through a network interface or adapter 1550, a modem 1552, or other suitable means for establishing communications over the network. Modem 1552, which may be internal or external, is connected to bus 1506 via serial port interface 1542.

As used herein, the terms "computer program medium," "computer-readable medium," and "computer-readable storage medium" are used to generally refer to memory devices or storage structures such as the hard disk associated with hard disk drive 1514, removable magnetic disk 1518, removable optical disk 1522, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1532 and other program modules 1534) may be stored on the hard disk, magnetic disk, optical disk, ROM, or RAM. Such computer programs may also be received via network interface 1550, serial port interface 1542, or any other interface type. Such computer programs, when executed or loaded by an application, enable computer 1500 to implement features of embodiments of the present invention discussed herein. Accordingly, such computer programs represent controllers of the system 1500.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1500 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for implementing a digital personal assistant, comprising:
   receiving a digital representation of an utterance of a user of the digital personal assistant;
   based on at least an analysis of the digital representation of the utterance, determining that the utterance comprises an utterance intended to engage with a persona of the digital personal assistant;
   in response to at least the determining that the utterance comprises an utterance intended to engage with the persona of the digital personal assistant, identifying a plurality of eligible responses to the utterance, the plurality of eligible responses including:
      at least one multimedia object associated with a popular culture reference; and
      speech comprising an impersonation of a voice of a person associated with the popular culture reference; and
   selecting one of the plurality of eligible responses and causing the selected response to be displayed when the selected response includes the at least one multimedia object or played back when the selected response includes the speech by the digital personal assistant.

2. The method of claim 1, wherein the selected response to the utterance includes text comprising a quotation associated with the popular culture reference.

3. The method of claim 1, wherein the speech comprises a quotation associated with the popular culture reference.

4. The method of claim 1, wherein the selected response includes a visual representation of the digital personal assistant that evokes the popular culture reference.

5. The method of claim 4, wherein the visual representation of the digital personal assistant comprises an animation of the digital personal assistant.

6. The method of claim 1, wherein the multimedia object comprises:
   image or video content that is suitable for display within a user interface of the digital personal assistant or audio content that is suitable for playback by the user interface of the digital personal assistant.

7. The method of claim 1, wherein the selected response includes:

a link that is suitable for display within a user interface of the digital personal assistant and that can be activated by the user to access content associated with the popular culture reference.

8. The method of claim 1, wherein identifying the plurality of eligible responses to the utterance comprises:
matching the utterance to a particular utterance type within a hierarchical tree of utterance types, each utterance type in the hierarchical tree of utterance types having one or more responses associated therewith.

9. The method of claim 1, wherein identifying the plurality of eligible response to the utterance comprises:
determining that the utterance is associated with a trending topic; and
in response to determining that the utterance is associated with the trending topic, identifying one or more responses associated with the trending topic.

10. The method of claim 1, identifying the plurality of eligible responses to the utterance comprises:
determining that the utterance is an utterance for which there are one or more predefined responses intended to convey the persona of the digital personal assistant.

11. The method of claim 1, wherein causing the selected response to be displayed or played back by the digital personal assistant comprises:
sending an audio file that includes the speech or information that identifies the audio file to a computing device executing the digital personal assistant.

12. The method of claim 1, wherein causing the selected response to be displayed or played back by the digital personal assistant comprises:
providing text to a computing device executing the digital personal assistant, the text to be processed by a text-to-speech component of the digital personal assistant to generate the speech.

13. A computing device, comprising:
at least one processor; and
a memory that stores computer program logic for execution by the at least one processor, the computer program logic including one or more components configured to perform operations when executed by the at least one processor, the one or more components including:
a digital personal assistant configured to capture audio that represents an utterance of a user and to transmit the audio to a digital personal assistant backend, the utterance comprising an utterance intended to engage with a persona of the digital personal assistant;
the digital personal assistant being further configured to provide a response to the utterance based at least on information received from the digital personal assistant backend, providing the response including generating or playing back speech that comprises an impersonation of a voice of a person associated with a popular culture reference.

14. The computing device of claim 13, wherein the digital personal assistant is configured to play back an audio file that includes the speech.

15. The computing device of claim 13, wherein the digital personal assistant is configured to apply text-to-speech conversion to text to generate the speech.

16. The computing device of claim 13, wherein providing the response further includes at least one of:
displaying or playing back a multimedia object by a user interface of the digital personal assistant, the multimedia object being associated with the popular culture reference;
displaying text within the user interface of the digital personal assistant, the text comprising a quotation associated with the popular culture reference;
displaying a visual representation of the digital personal assistant that evokes the popular culture reference within the user interface of the digital personal assistant; and
displaying a link within the user interface of the digital personal assistant that can be activated by the user to access content associated with the popular culture reference.

17. A computing device, comprising:
at least one processor; and
a memory that stores computer program logic for execution by the at least one processor, the computer program logic including one or more components configured to perform operations when executed by the at least one processor, the one or more components including:
a digital personal assistant configured to capture audio that represents an utterance of a user and to transmit the audio to a digital personal assistant backend, the utterance comprising an utterance intended to engage with a persona of the digital personal assistant;
the digital personal assistant being further configured to:
based at least on information received from the digital personal assistant backend, provide a response to the utterance that is selected from among a plurality of eligible responses that includes at least one of text or audio and a multimedia object associated with a popular culture reference, providing the response including displaying the response for the text or the multimedia object or playing back the response for the audio by a user interface of the digital personal assistant.

18. The computing device of claim 17, wherein the multimedia object comprises an image, video content, or audio content.

19. The computing device of claim 17, wherein providing the response further includes at least one of:
generating or playing back speech that comprises an impersonation of a voice of a person associated with the popular culture reference;
displaying text within the user interface of the digital personal assistant, the text comprising a quotation associated with the popular culture reference;
displaying a visual representation of the digital personal assistant that evokes the popular culture reference within the user interface of the digital personal assistant; and
displaying a link within the user interface of the digital personal assistant that can be activated by the user to access content associated with the popular culture reference.

* * * * *